(12) United States Patent
Kim

(10) Patent No.: US 7,445,020 B2
(45) Date of Patent: Nov. 4, 2008

(54) RELIEF VALVE ASSEMBLY

(75) Inventor: Youngman Kim, Gimhae-si (KR)

(73) Assignee: Unitech Co., Ltd., Gimhae-SI (KR)

( * ) Notice: Subject to any disclaimer, the term of this patent is extended or adjusted under 35 U.S.C. 154(b) by 316 days.

(21) Appl. No.: 11/284,743

(22) Filed: Nov. 22, 2005

(65) Prior Publication Data

US 2007/0113902 A1    May 24, 2007

(51) Int. Cl.
   *F16K 17/194* (2006.01)
(52) U.S. Cl. .............................. 137/493.8; 137/533.27
(58) Field of Classification Search ............. 137/493.8, 137/493.9, 533.27, 543.15; 220/203.28
   See application file for complete search history.

(56) References Cited

U.S. PATENT DOCUMENTS

| | | | | |
|---|---|---|---|---|
| 1,045,534 A | * | 11/1912 | Elwell | 137/516.23 |
| 1,045,619 A | * | 11/1912 | Schweizer | 137/543.15 |
| 1,897,076 A | * | 2/1933 | Shand | 137/248 |
| 2,296,492 A | * | 9/1942 | Begley, Sr. | 137/512.1 |
| 4,103,705 A | * | 8/1978 | Wagner et al. | 137/544 |
| 4,147,096 A | * | 4/1979 | Caswell | 454/20 |
| 4,760,863 A | * | 8/1988 | Broer | 137/493.8 |
| 5,060,688 A | | 10/1991 | Sorensen | |
| 5,873,384 A | | 2/1999 | Pedersen et al. | |
| RE37,989 E | | 2/2003 | Pedersen et al. | |
| 6,604,544 B2 | | 8/2003 | Kwang | |

FOREIGN PATENT DOCUMENTS

WO    WO 02/095275    11/2002

* cited by examiner

*Primary Examiner*—Stephen M Hepperle
(74) *Attorney, Agent, or Firm*—Notaro & Michalos P.C.

(57) ABSTRACT

The present invention has completely broken from the unreasonable construction of conventional type of relief valve which places weight and lifting disc inside of upper body or lower body. In other words, lifting disc and weight are placed outside of upper body. It is brand-new construction that adopts casket-shaped housing forming flow slot which guides releasing gas to move upwards vertically when the above-mentioned lifting disc ascends by the releasing gas from tank. And also the present invention features that drain part is formed to drain all the time sea water or rain gathering inside of casket-shaped housing to outside of casket-shaped housing and brand-new construction of vacuum relief valve is equipped.

9 Claims, 6 Drawing Sheets

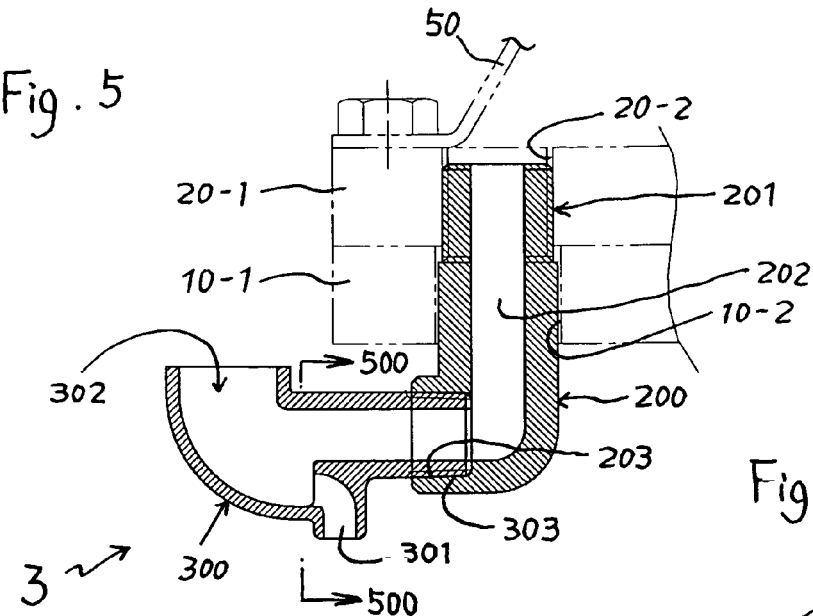
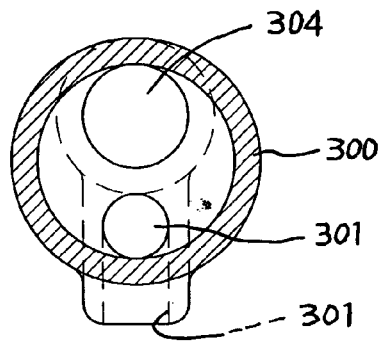
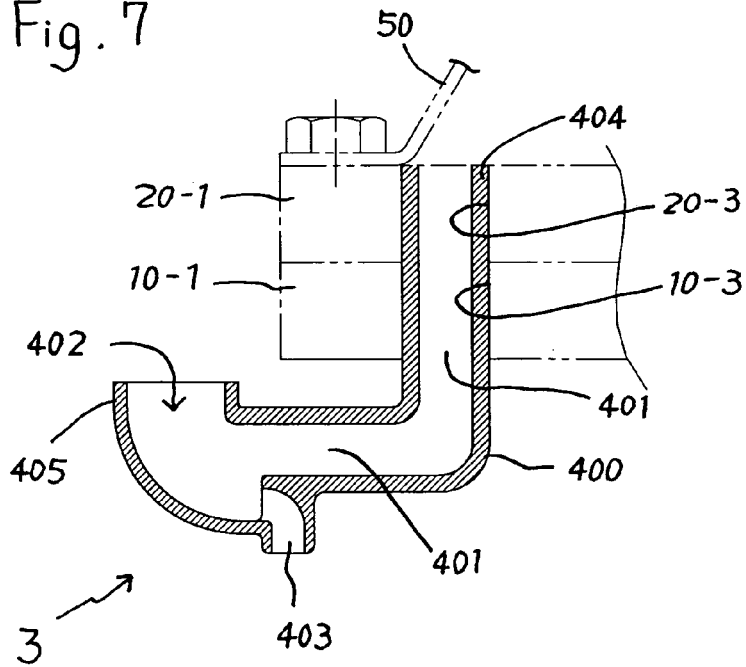

RELIEF VALVE ASSEMBLY

BACKGROUND OF THE INVENTION

1. Technical Field

The invention is related to relief valve assembly which can be used for vessels carrying oils or chemical products, or for chemical tanks.

2. Description of the Prior Art

Conventional types of relief valves (ie: U.S. Pat. No. 6,604, 544/RE37,989/U.S. Pat. No. 5,060,688/U.S. Pat. No. 5,873, 384), due to their constructional limitations, have a lifting disc and weight placed inside of their upper body. This causes low closing pressure of the valve, which, in turn, releases an excessive amount of gas and leads to environmental pollution, decrease in safety of the tank and an uneconomical result. Relief valves used for vessel release a small amount of pressure gas through the path between a disc seat assembled with upper body and pressure disc. However the gas release is not upwards in a vertical direction but sideways to a wide spread owing to the influence of ocean wind. Therefore, conventional relief valves can not guarantee the safety against fire and safety accidents.

Further, conventional relief valves, as a result of their lifting disc and standard weight being placed inside of their upper body, do not allow proper release of pressure gas. Therefore, this makes it difficult to release the gas in short time, which causes a hammering phenomenon. Cleaning and repairing the valve becomes cumbersome when the relief disc and the weight are contaminated owing to the volatile steam containing gas compound and high viscosity of solvent based foreign ingredients.

Moreover, while the relief valve is kept sealed, the relief disc, weight and stem are always exposed to released gas which increases erosion of the parts so raw materials of high erosion resistance are expensive and uneconomical. Additionally, conventional types of relief valves, when increasing or decreasing the weight, automatically requires disassembling the whole upper and lower body out of the tank. This causes poor work efficiency as it consumes long periods of work time. All of these issues present with conventional relief valves are not to be overlooked in relief valve assembly construction.

The reason for low closing pressure of conventional relief valves is that the lifting disc and weight are placed inside of the upper body so it is quite unavoidable to see the disc and weight in a floating state unnecessarily for a long time by the pressure of releasing gas while the valve is closed. In other words, since the disc and weight placed inside the upper body are not provided with sufficient atmospheric pressure, the closing pressure is naturally reduced and therefore the valve opens for a longer period of time than necessary. The releasing gas passing between the pressure disc and disc seat assembled within the upper body, without a casket-shaped housing(50) that can lead out gas upwards in a vertical direction, travels sideways to a wide spread with a top part of upper body as a start point. Thus, the possibility of safety accidents and fire is increased.

Another example of a relief valve that has been claimed to remove excessive release of pressure gas inside a tank is published in international reference No. WO 02/095275. This, relief valve has a magnet fixed in the lower part of a stem with which the lifting disc and weight are assembled, and another magnet fixed inside of the lower body. These magnets react to each other as they become closer or contact each other.

In such circumstances, pressure gas which is generated inside of the tank, increases the gap between the magnets and at the same time pushes upwards the lifting disc and weight. The gas is then released outside of the upper body into the air. The magnetic force between the magnets might work even while the pressure gas is released out into the air. Therefore, when the release pressure starts to decrease in accordance with reduction to releasing amount of gas pressure after initial release of pressure gas, the lifting disc and weight are forced to move down by magnetic force and pressure disc closes valve. These technical considerations might be worthwhile to suggest.

However, the relief valve of inter national publication No. WO 02/095275, is complicated which increases manufacturing cost and makes it difficult to handle due to its heavy weight and also does not fit for the vessel that needs weight reduction. Therefore, the relief valve is not easy for manufacturing, transporting, facilitating, and maintaining (repairing and replacing units). It is quite inconvenient in workability, and furthermore causes unreasonable trouble that in replacing magnet it is necessary to separate it from the tank even lower body which is of heavy weight.

In addition to above, relief valve in above-mentioned international publication No. WO 02/095275 also has the same problems and defects as afore-mentioned conventional type of relief valve because it's stem, lifting disc, weight, magnet in lower part of stem, magnet inside of lower body are all inside of the upper body and lower body.

The following discussion is with regard to the problems and defects of conventional types of vacuum relief valves.

Compared to the FIG. 8 of the invention, conventional types of vacuum relief valves which stably convert buoyant pressure generated inside of tank to the level of atmospheric pressure as supersaturated gas inside of tank release out into the air, is composed of screen cover(670) and screen hood (680) which are both in one unit or assembled with body(600) and cast-iron. This construction is heavy weighed, and thus quite improper for vessels, complicated in fixing construction of screen(690), difficult to manufacture, inconvenient in assembling, maintaining and repairing and expensive.

Another example of a vacuum relief valve which attempts to solve these problems and defects, compared to the FIG. 8 of the invention, has a welded ring-shaped support unit to the center of a screen(690) and a stem path through the above support unit, so the weight of the support unit is imposed on the screen(690) and hence, as per the elapse of time, screen (690) tends to droop down consequently leading to the needs for frequent replacement or repairing work that is quite inconvenient and uneconomical.

Along with this, conventional relief valves have difficulty with proper gas releasing due to flow variation of releasing gas which is caused by extra weight of assist weight when adding assist weight to standard weight. Accordingly, closure function of the disk does not work consistently all the time when using standard weight only and when using both standard weight and assist weight.

BRIEF SUMMARY OF THE INVENTION

In the relief valve which can be equipped for vessels carrying oils or chemical products or for chemical tanks to safely release pressure gas (supersaturated gas) inside of the tank out into the air, the invention is featured as having, a lower body(10) which is fixed through to tank;

an upper body(20) in which rib(22) is one-bodied with boss(23) having screw hole for assembling screw part(61) of stem(60) and with which disc seat(21) is assembled;

a lifting disc(30) which has ring(33) at lower side, protruding stage(34) contacting with disc seat(21) of upper body(20) and closing valve, the first hole(32) penetrated by stem(60) and the second hole(31) in which stopper(62) assembled with stem(60) can be moved by cap nut(63);

a weight(40) which is assembled with lifting disc(30) by bolt(80);

a weight cover(70) which protects weight(40) and provides space inside to enable assembling assist weight(90);

a fixable stem(60) which has screw part(61) assembled with boss(23) of upper body(20) and guides lifting disc(30) to move up and down;

a stopper(62) which is fixed to top part of stem(60) by cap nut(63) and restricts ascending distance of lifting disc(30);

a housing(50) which is assembled with upper body(20) and leads releasing gas upwards out in a vertical direction;

a water (sea water or rain) drain part(3) which is assembled by passing through flange(20-1) of upper body and flange(10-1) of lower body and drains water (sea water or rain) gathering inside of the housing(50) to outside;

a vacuum: relief valve(5) which is assembled with lower body(10) and functions to build up atmospheric pressure inside of tank.

And also in the relief valve which can be equipped for vessels carrying oils or chemical products or for chemical tanks to safely release pressure gas (supersaturated gas) inside of tank out in the air, the invention is featured as having, a lower body(10a) which is fixed through to tank;

an upper body(20a) in which rib(22a) is one-bodied with boss(23a) having screw hole for assembling screw part(61a) of stem(60a) and with which disc seat(21a) is assembled;

a lifting disc(30a) which has protruding stage(34a) contacting with disc seat(21a) of upper body(20a) and closing valve, the first hole(32a) penetrated by stem(60a) and the second hole(31a) in which the stopper(62a) assembled with stem(60a) can move by cap nut(63a);

a first weight(40a) which is assembled with lifting disc(30a) by bolt(80a) and has in the center bushing(150) assembled with the second hole(31a) of lifting disc(30a);

a second weight(40b) which has ring(33a) at lower side and assembled with the first weight(40a) by bolt(80b);

a weight cover(70a) which is assembled with the second weight(40b) by weight cover bolt(110a);

a fixable stem(60a) which has screw part(61a) assembled with boss(23a) of upper body(20a) and guides lifting disc (30a) to move up and down;

a stopper(62a) which is fixed to top part of stem(60a) by cap nut(63a) and restricts ascending distance of lifting disc (30a);

a housing(50) which is assembled with upper body(20a) and leads releasing gas upwards out in a vertical direction;

a water (sea water or rain) drain part(3) which is assembled by passing through flange(20-1) of upper body and flange(10-1) of lower body and drains water (sea water or rain) gathering inside of the housing(50) to outside and;

a vacuum relief valve(5) which is assembled with lower body(10) and functions to build up atmospheric pressure inside of tank.

In the relief valve assembly, the housing is featured as being assembled with the upper body(20) and the flange(53) by bolts and nuts and building up a small diameter part(D1) which forms a narrow slot(G) with a side of the lifting disc (30), a large diameter part(D2) which forms a wide slot(G1) with a side of the lifting disc(30) when the lifting disc(30) moves up and an incline part(52) which is formed in the connection area between the large diameter part(D2) and the small diameter part(D1).

In the relief valve assembly, another housing is featured as being assembled with the upper body(20a) and the flange (53a) by bolts and nuts and building up a small diameter part(D1) which forms a narrow slot(G) with a side of the second weight(40b), a large diameter part(D2) which forms a wide slot(G1) with a side of the second weight(40b) when the second weight(40b) moves up and an incline part(52) which is formed in the connection area between the large diameter part(D2) and the small diameter part(D1).

In the relief valve assembly, the outside diameter of the lifting disc(30) is featured as being larger than the outside diameter of the disc seat(21).

In the relief valve assembly, the outside diameters of the lifting disc(30a) and the first weight(40a) are featured as being larger than the outside diameter of the disc seat(21a) and smaller than the outside diameter of the second weight (40b).

In the relief valve assembly, the water (sea water or rain) drain part(3) is featured as having, a vertical elbow(200) which forms a screw(201) assembled through a screw hole(20-2) in the flange(20-1) of the upper body(20) a screw hole(203) at the opposite side of the screw (201);

a horizontal elbow(300) which forms a screw(303) assembled with a screw hole(203) of the vertical elbow(200) and;

a gas releasing slot(302) extending upwards vertically and a sea water or rain drain slot(301) extending downwards vertically.

In the relief valve assembly, another water (sea water or rain) drain part(3) is featured as having, an inner part which is penetrated by a hole(401), a "J" shaped body(400), a head part(404) which is fixed through the holes(20-3)(10-3) of the upper body and the lower body, a tail part(405) which is at the opposite side of the head part(404) and faces upwards vertically, a gas releasing slot (402) which is formed inside of the tail part(405) and a sea water or rain drain slot(403) which is formed at the bottom of the body(400).

In the relief valve assembly, a vacuum relief valve(5) is featured as structuring stem support(610) which is assembled through the hole(603) of the lower part of the body(600), the upper part of which is assembled with a ring seat(620) contacting the closure disc(630) and which has a rib(611) and boss(612);

a bushing(640) which is assembled with the boss(612) of the stem support(610) and supports the stem(660) assembled with the closure disc(630);

a screen cover(670) which is assembled with the lower part of the stem support(610);

a screen(690) which is assembled with a screen cover(670) and a screen hood(680) which is placed under the screen(690) and has an air hole(681) in the center and;

a snap ring(650, 651) which is assembled with a bushing (640) penetrating the center of the screen(690) and prevents the screen(690) from moving up and down.

BRIEF DESCRIPTION OF THE DRAWINGS

FIG. 5 is a referential view indicating the water (sea water or rain) drain part of the invention;

FIG. 6 is a cross sectional view of 500-500 in FIG. 5;

FIG. 7 is a referential view indicating water (sea wateror rain) drain part representing another embodiment of FIG. 5.

DETAILED DESCRIPTION OF THE PREFERRED EMBODIMENT

The followings are to describe the composition and operating mechanism of the invention with reference to the drawings attached.

Figure 1:
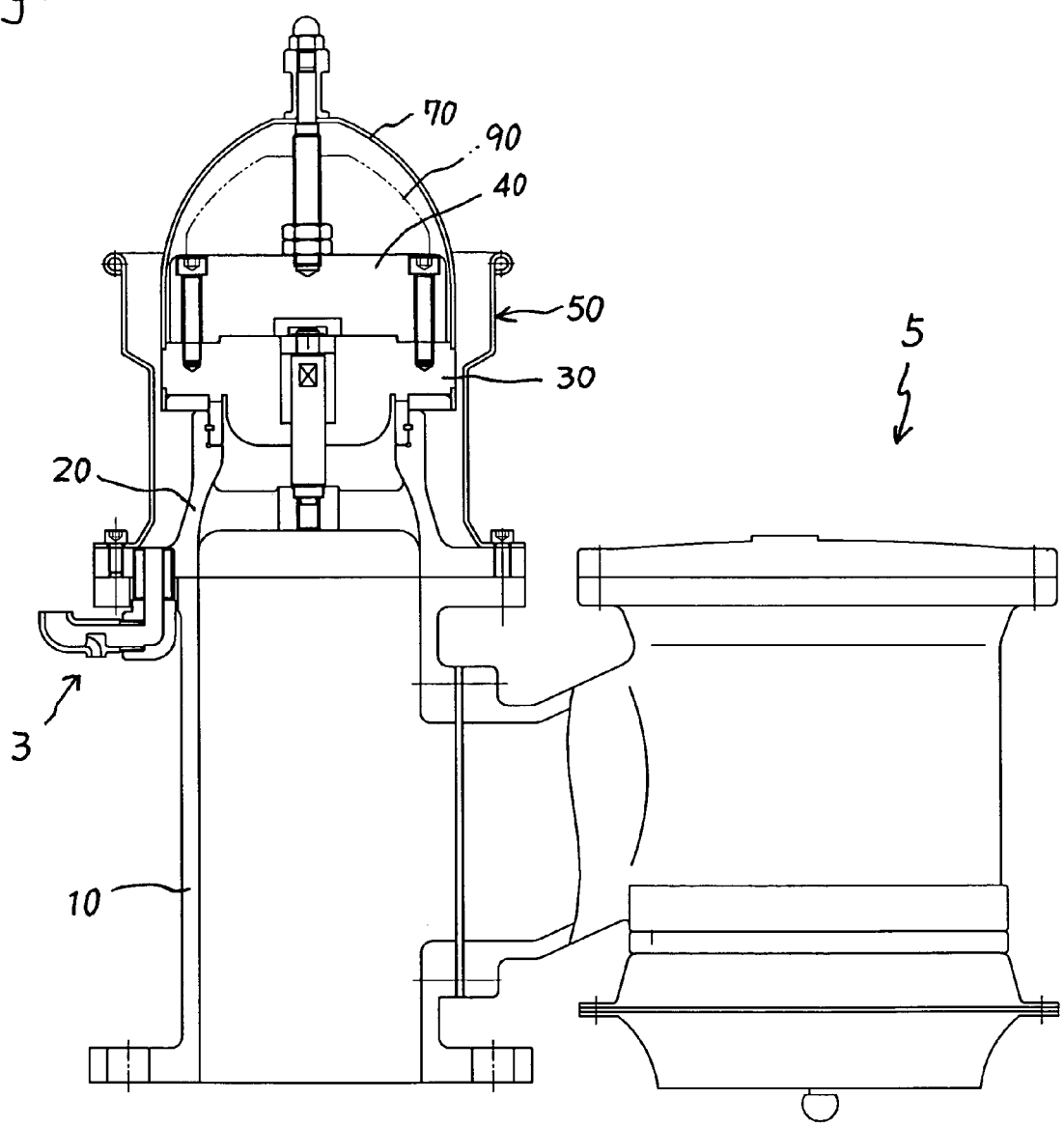
FIG. 1 is a referential view indicating a state of operation of the invention.
Figure 2:
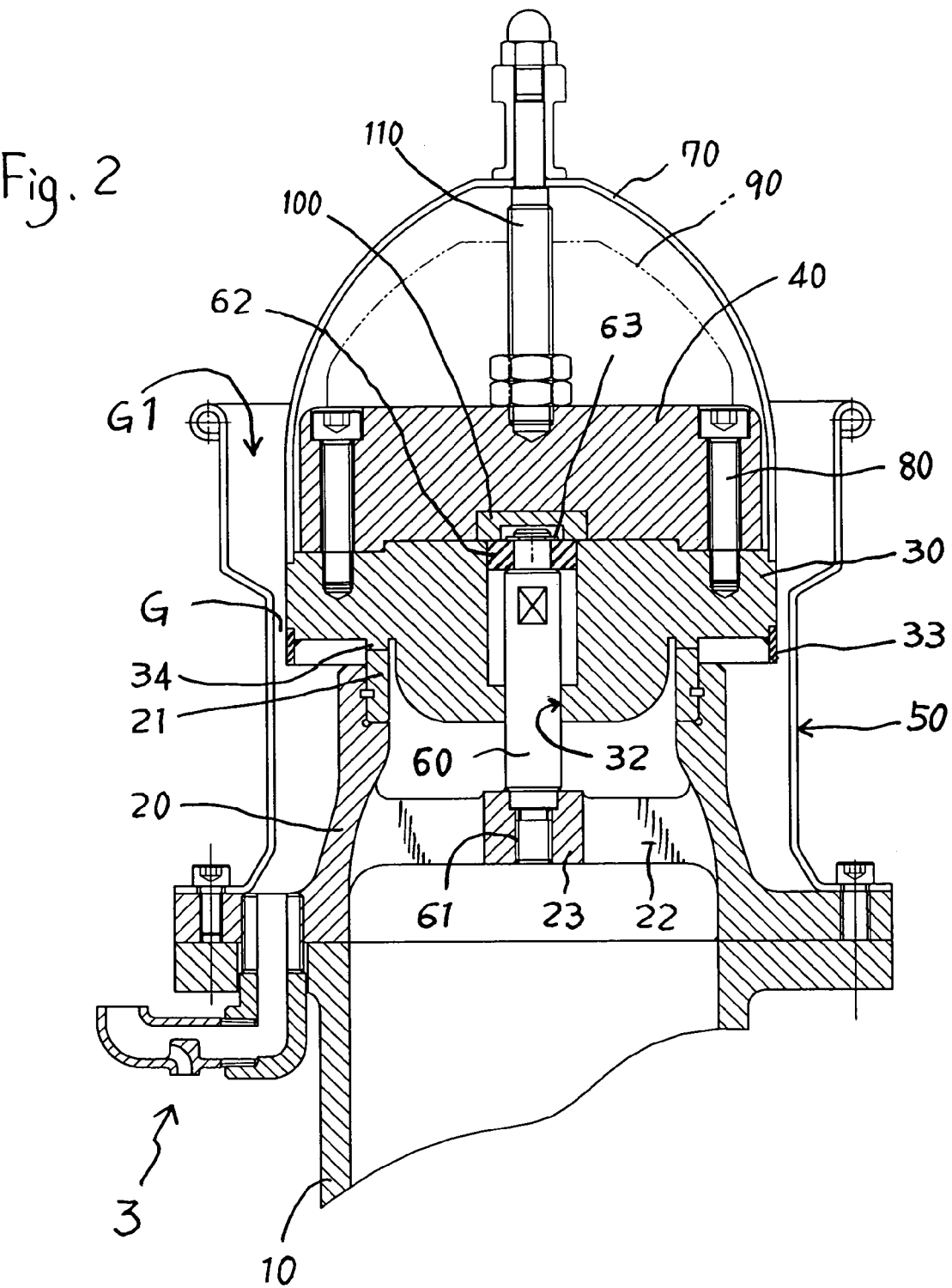
FIG. 2 is a partially enlarged view of the relief valve according to the first embodiment of the invention.
Figure 3:
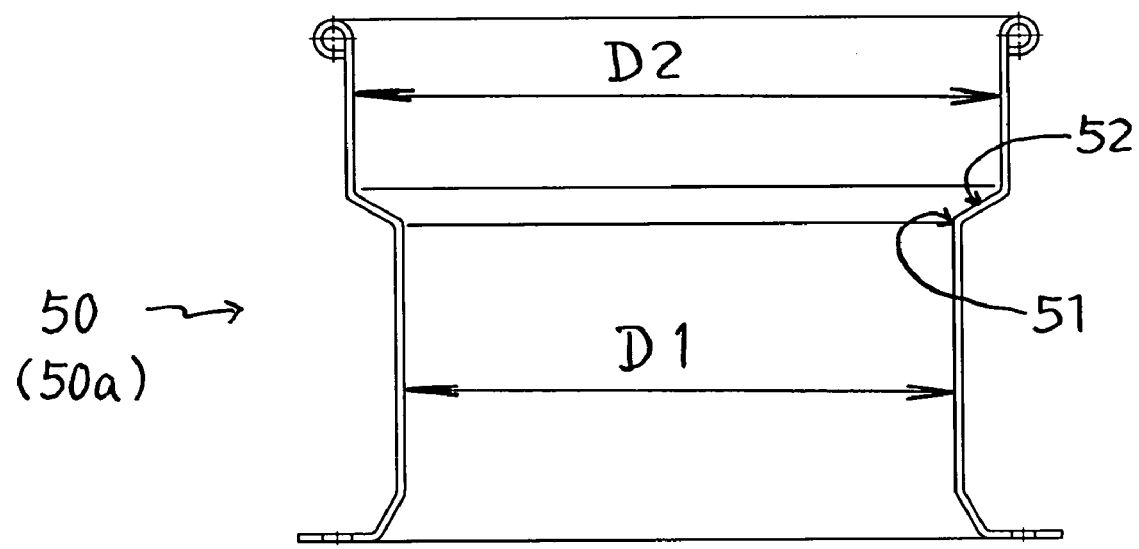
FIG. 3 is a referential view indicating the housing of the invention.
Figure 4:
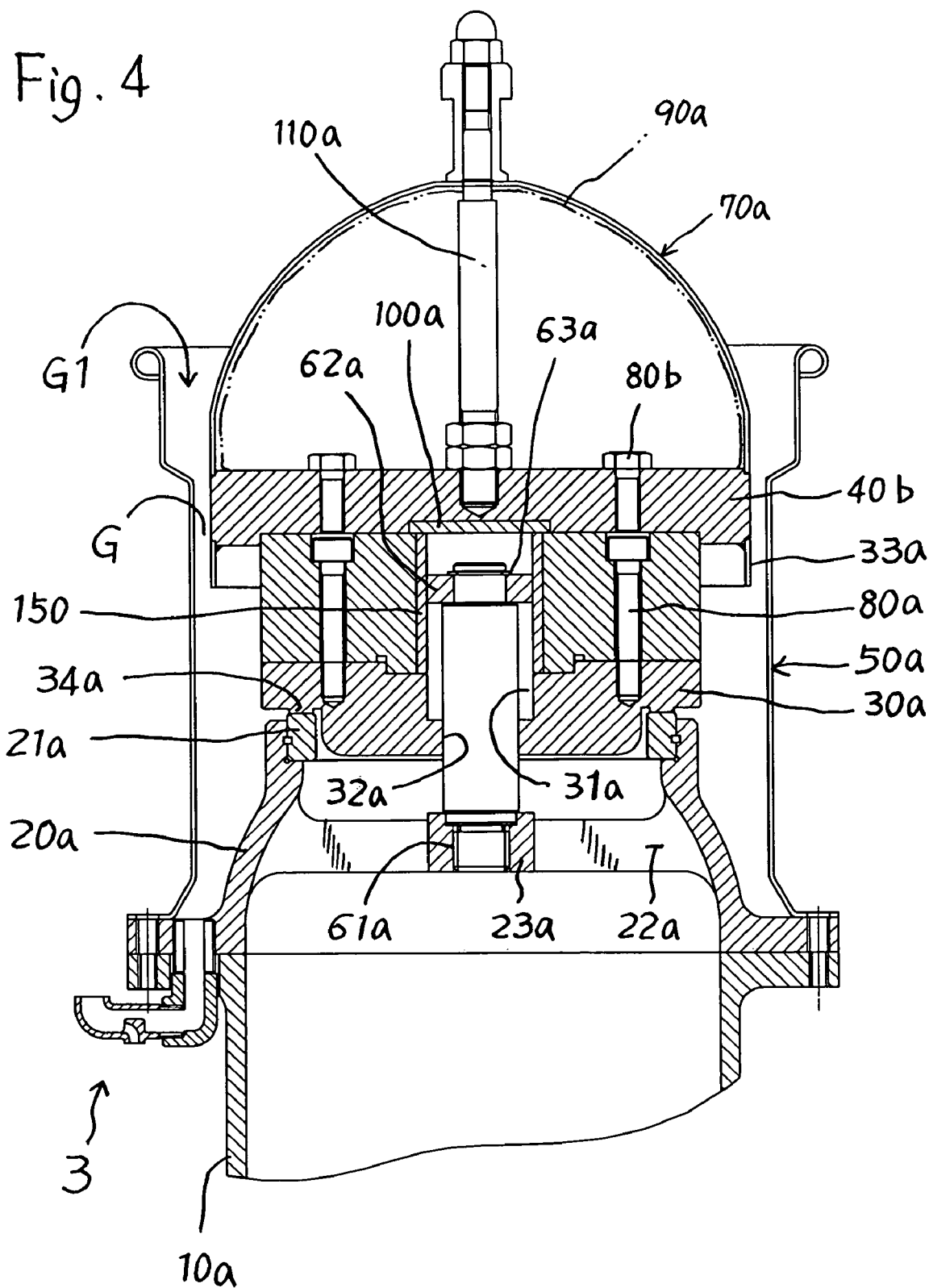
FIG. 4 is a partially enlarged view of the relief valve according to the second embodiment of the invention.

FIGS. 1 and 2 refer to an assembly drawing which indicates a state of operation in the first embodiment of the invention, and a state of closure of the relief valve in which vacuum relief valve(5) is assembled with sides of the lower body(10). FIG. 4 illustrates the second embodiment of the present invention. In FIG. 2 and FIG. 4, referring to the relief valve, a lever system which can manually operate lifting disc(30)(30a) is not illustrated.

In the relief valve of the present invention, as described earlier, the lifting disc(30)(30a), the weight(40), the first weight(40a) and the second weight(40b) are not placed inside of upper body(20)(20a) or lower body(10)(10a). The weights are placed in the air above the upper body(20)(20a) as illustrated in FIGS. 2 and 4. The housing(50)(50a) is formed to guide releasing gas to flow upwards vertically. The water (sea water or rain) drain part(3) is newly formed and the vacuum relief valve(5) of new construction is also formed. All the parts herein are featured as being of new construction.

The relief valve of the present invention allows for easy replacement and repair of the main parts inside of the housing (50)(50a) without separating the upper body(20)(20a) from the lower body(10)(10a). Therefore, the relief valve of the invention is easy to manufacture, maintain and repair. With it's simple construction, the relief valve is light-weight and easy to handle. It is suitable for use as a relief valve of a tank in land and in a vessel as well.

The relief valve of the invention represents a great deal of constructional difference from conventional types of relief valves (i.e., U.S. Pat. No. 6,604,544/U.S. Pat. No. RE37,989/ U.S. Pat. No. 5,060,688, U.S. Pat. No. 5,873,384) and the relief valve disclosed in International Publication No. WO 02/095275. Therefore, it can resolve the problems with and defects in conventional types of relief valves.

First, in the first embodiment, the lower body(10) is empty inside without any parts assembled therein as shown in FIG. 1. Thus, the lower body is easy to manufacture and light weight. Further, the lower body does not obstruct the release of gas.

Next, inside of the upper body(20) which is connected to the lower body(10) by bolts and nuts, a boss(23) is formed and united into one body with the upper body(20) by a rib(22). As there is a hole in the boss(23), a screw part(61) of a stem(60) is received by the screw hole of boss(23). Therefore, the stem(60) of the invention, in contrast to conventional types of relief valves, does not move up and down together with the weight, the lifting disc and the pressure valve at the same time but is rather fixed to upper body(20) and shows no movement.

A disc seat(21) is assembled with the upper body(20). The disc seat(21) contacts a protruding stage(34) of a lifting disc (30). The lifting disc(30) forms the first hole(32) in the center area and lets the stem(60) pass through. Providing that the stem(60) fixed to the boss(23) is a piston, the lifting disc(30) acts as a cylinder moving up and down. Thus, only the lifting disc(30) and weight(40) ascend together and release gas out while the stem(60) is in a fixed position. In further detailed review of the construction of the lifting disc(30), the second hole(31) and the first hole(32) are formed and a ring-shaped stopper(62) which is fixed by the cap nut(63) is inside of the second hole(31). Therefore, the ascending distance of lifting disc(30) is restricted by the stopper(62). In this case, the stopper(62) can be assembled with the top of the stem(60) by snap ring instead of the cap nut(63). The stopper(60) can be made of metals, nonferrous metals, plastic or synthetic resins, among other materials.

Further, the lifting disc(30) has a ring(33) as shown in FIG. 2, and this ring can be fixed by welding or united into one body with lifting disc(30). The ring(33) facilitates the lifting disc(30) to ascend by releasing gas passing through the gap between the disc seat(21) and the protruding stage(34) of the lifting disc(30). But in some case ring(33) can also be out of adoption.

Next, the lifting disc(30) is connected to the weight(40) by a bolt(80). When the weight of the weight(40) needs to be added, it is simply required to keep the upper body(20) and the lower body(10) as is, unfasten weight cover fixing a bolt(110), separate weight cover(70) from the weight(40), place an assist weight(90) on the weight(40), and assemble again the weight cover(70) with weight cover fixing a bolt (110). In case of conventional types of relief valves, it is required to separate the upper body and the lower body from tank, replace weight or assemble assist weight and then assemble again the upper body and the lower body with tank. Therefore, it causes poor work efficiency, inconveniences and is a waste of costs and time. However the invention is, needless to be compared with conventional type of relief valve, far convenient, safe and makes it possible to finish the work in short time in adding weight.

The housing(50) represents the shape of a casing which is relatively thin. It forms a large diameter part(D2) and a small diameter part(D1) and an incline part(52) in the connection area between a small diameter part(D1) and a large diameter part(D2). This housing(50) is assembled with the upper body (20) and is fixed with the flange(53) by bolts and nuts. It is quite natural to manufacture the inside diameter of small diameter part(D1) of the housing(50) larger than inside diameter of disc seat(21).

In the first embodiment of the invention, the valve remains closed as shown in FIG. 1 and opened when pressure gas generated inside tank reaches a state of supersaturation. By this time pressure gas inside of tank causes the lifting disc(30) to ascend and separate the valve seat(21) and protruding stage(34). In this case, the lifting disc(30) can move up more properly with the help of the ring(33). As illustrated, the releasing gas ascends vertically through the narrow slot(G) between the small diameter part(D1) of the housing(50) and a side surface of the lifting disc(30) and starts passing out in the air. Additionally, as the amount of released gas increases, the lifting disk(30) further ascends. In other words, the ring(33) moves to a higher position than starting point(51) of an incline part of the housing(50) and the amount of releasing gas increases. Therefore, a wide slot(G1) is formed between the large diameter part(D2) of the housing(50) and the side of the lifting disc(30) and releasing gas ascends vertically and passes out to a maximum extent.

One thing to be carefully reviewed here is that the housing (50) of the invention is exposed to the air and the lifting disc(30) and weight(40) are also exposed to the air inside of the housing. In other words, in contrast to a conventional type of relief valve, the lifting disc(30) and the weight(40) are not placed inside of the upper body(20). Accordingly, it must not be overlooked as an important fact that atmospheric pressure is well maintained all the time in the lifting disc(30) and the weight(40) of the invention.

Supersaturated gas swiftly releases into the air and the time collapses then the releasing pressure of gas is reduced. Accordingly, the lifting disc(30) and the weight(40) start to descend slowly and then continue to descend smoothly and swiftly to close the valve on account of atmospheric pressure. The lifting disc(30) and the weight(40) are not placed inside of the upper body(20) and therefore are not influenced by the pressure of releasing gas at last stage. The reason for this is that atmospheric pressure works well along with the weight of the parts together with the weight of lifting disc(30) and weight(40). Therefore, the valve closes swiftly without excessive release of gas.

The following refers to the second embodiment of the invention. There is little difference in operation from the first embodiment to the second embodiment except for some differences in construction. In other words, the upper body(20) and disc seat (21) in the first embodiment and the upper body(20a) and disc seat (21A) in the second embodiment have the same constructions. The lifting disc(30) in the first embodiment has almost same construction as the lifting disc (30a) in the second embodiment.

A slight difference is that the stopper(62) in the first embodiment is placed inside of the second hole(31) of the lifting disc(30) but the stopper(62a) in the second embodiment is placed inside of a bushing(150) of the first weight (40a). In addition, the first embodiment uses one weight(40) but the second embodiment uses two weights namely the second weight(40b) and the first weight(40a). Of course, the weight of the weight(40) in the first embodiment equals the total weight of the two weights(40b), and (40a) in the second embodiment.

Further, in the first embodiment, the ring(33) is in the lifting disc(30) but in the second embodiment, ring(33a) is in the second weight(40b). The reason for this difference is that in the first embodiment the outside diameter of the lifting disc(30) is larger than the outside diameter of the disc seat (21). Thus, it is better to fix the ring(33) in the lifting disc(30). However in the second embodiment the outside diameters of the lifting disc(30a) and the first weight(40a) are a little larger than the outside diameter of the disc seat(21a) and the outside diameter of the second weight(40b) is larger than the outside diameter of the disc seat(21a). Therefore, it is better to fix the ring(33a) in the second weight(40b).

In the second embodiment, it needs to be further noted that the bushing(150) assembled inside of the first weight(40a) can be removed when necessary.

Further, the housing(50a) used in the second embodiment is assembled with the top part of the upper body(20a) and the flange(53a) by bolts and nuts and has a small diameter part (D1) forming narrow slot(G) with a side of the second weight (40b) and a large diameter part(D2) forming a wide slot(G1) with a side of the second weight(40b).

In conclusion, the function of the housing(50a) in the second embodiment is almost the same as that of the housing(50) in the first embodiment.

As illustrated, the relief valve in the first and second embodiments of the invention does not open for a longer time than necessary because the close pressure increases in the close cycle. According to a test of the invention, it has been found that the ascending ratio of close pressure in the close cycle increases by about 30-40% against a conventional type of relief valve.

As another reference, in the first embodiment packing (100) can be assembled in a lower face of the weight(40). It can also be replaced with an O-ring. The packing(100) might be safer because it prevents the gas inside of the tank from leaking out of the relief valve. However, the relief valve is manufactured so precisely that it does not necessarily call for a packing(100).

As is the same case, the packing(100a) can also be removed from the second embodiment.

In contrast to a conventional type of relief valve, the lifting disc(30)(30a), the weight(40) and the first and second weight (40a)(40b) of the invention are not placed inside of the upper body(20)(20a). Thus, these parts have no or little exposure to the releasing gas when the relief valve is closed which avoids erosion. Accordingly, these parts do not have to be made of expensive raw material of high erosion resistance. In addition, testing revealed that the housing(50)(50a) enables releasing gas to move upwards vertically and safely pass out into the air and therefore almost eliminate the possibility of danger of fire or a safety accident.

Consequently, the relief valve of the first and second embodiments of the invention never falls in function behind the relief valve of International Publication No. WO 02/095275 mentioned earlier, is much cheaper in manufacturing, simple in construction, light weight, excellent in maintenance and repairing and safety.

The water (sea water or rain) drain part(3) of the invention can be adopted not only for the relief valve of the invention but also for a conventional type of relief valve. However, the conventional type of relief valve must adopt a housing(50) (50a) same as or similar to the present invention.

As illustrated earlier, the relief valve of the invention represents various features and merits against conventional types of relief valves. On the other hand, when sea water or rain gathers inside of the housing(50)(50a), it gets concentrated and interrupts the ascending and descending operation of the lifting disc. In addition, build-up of water inside the housing adversely affects the proper release of gas. It further makes parts such as the lifting disc, the weight, the upper body, as well as, the housing(50)(50a) apt to be eroded.

According to this water (sea water or rain) drain part(3) of the invention, as explained above, resolves the problems previously pointed out by draining all the time sea water or rain gathering inside of the housing(50)(50a) outwards properly.

FIG. 5 illustrates the operation state of above-mentioned drain part(3). It has a simple construction but plays an important role. That is to say, in the first embodiment, a screw(201) of a horizontal elbow(200) passes through the hole(10-2) which is formed in the flange(10-1) of the lower body(10) and is assembled with a screw hole(20-2) which is formed in the flange(20-1) of the upper body(20).

Accordingly, sea water or rain gathering inside of the housing(50) passes through the screw hole(20-2) in the flange(20-1) of the upper body(20) and enters inside of the hole(202) of the vertical elbow(200). The screw(303) of the horizontal elbow(300) is then assembled through the screw hole(203) of the vertical elbow(200). In this case, it is more advantageous to assemble the gas releasing slot(302) upwards vertically. Additionally, it is better to place the drain slot(301) for sea water or rain at the opposite side of the gas releasing slot(302) and downwards.

According to the above-mentioned invention, once the vertical elbow(200) and the horizontal elbow(300) are assembled, sea water or rain entering inside of the hole(202) of the vertical elbow(200) runs through the hole(304) of the horizontal elbow(300) and passes out downwards through the sea water or rain drain slot(301). Any large amount of sea water or rain which cannot be released through sea water or the rain drain slot(301) can also overflow through gas releasing path(302) downwards.

As shown in FIG. 5, in the flange(20-1) of the upper body(20) there is a screw hole(20-2) in order to drain out sea water or rain gathering inside of the housing(50) and assemble the vertical elbow(200). Therefore, when supersaturated gas inside the tank releases out into the air forcing up lifting disc(60), part of the releasing gas enters the screw hole(20-2) of the upper body(20). Accordingly, part of the releasing gas releases out through the screw hole(20-2), hole(202) of the vertical elbow(200) and the hole(304) of the horizontal elbow(300). Therefore, the horizontal elbow(300) necessarily requires forming the gas releasing slot(302) upwards vertically to ensure the safety of workers and reduce the danger of fire. In this case, the diameter of the gas releasing slot(302) is larger than that of the sea water or rain drain slot(301) and therefore the gas does not release through the drain slot(301) for sea water or rain. As for this reason, when the gas releases through the releasing gas slot(302) buoyant pressure is imposed to the sea water or rain drain slot(301).

The body(400) of the drain slot of the second embodiment, as shown in FIG. 7, is J-shaped and has a hole(401) all the way through inside and accordingly allows passage of supersaturated gas as well as sea water or rain.

The second embodiment inserts a head part(404) inside of the hole(20-3)(10-3) of same center point which penetrates the flange(20-1)(10-1) of the upper body and the lower body and fixed by welding.

In further review on FIG. 7, a tail part(405) has a gas releasing slot(402) connected with above-mentioned hole(401) and at a lower face of the body(400) there is sea water or rain drain slot(403) connected with above-mentioned hole(401).

The second embodiment, as 1-piece type, has structural differences from the first embodiment which is a 2-piece type but shows the same function. Therefore, the detailed explanation on the function of the first embodiment is applicable for the second embodiment.

The water (sea water or rain) drain slot(3) of the invention is assembled with a relief valve which has housing(50)(50a). Therefore, it releases at all times sea water or rain gathering inside of the housing(50)(50a) before concentrating and interrupting the ascending and descending operation of the lifting disc. It also safely releases part of supersaturated gas flowing back downwards inside of the housing upwards vertically only when the supersaturated gas inside of the tank releases through the relief valve.

Figure 8:
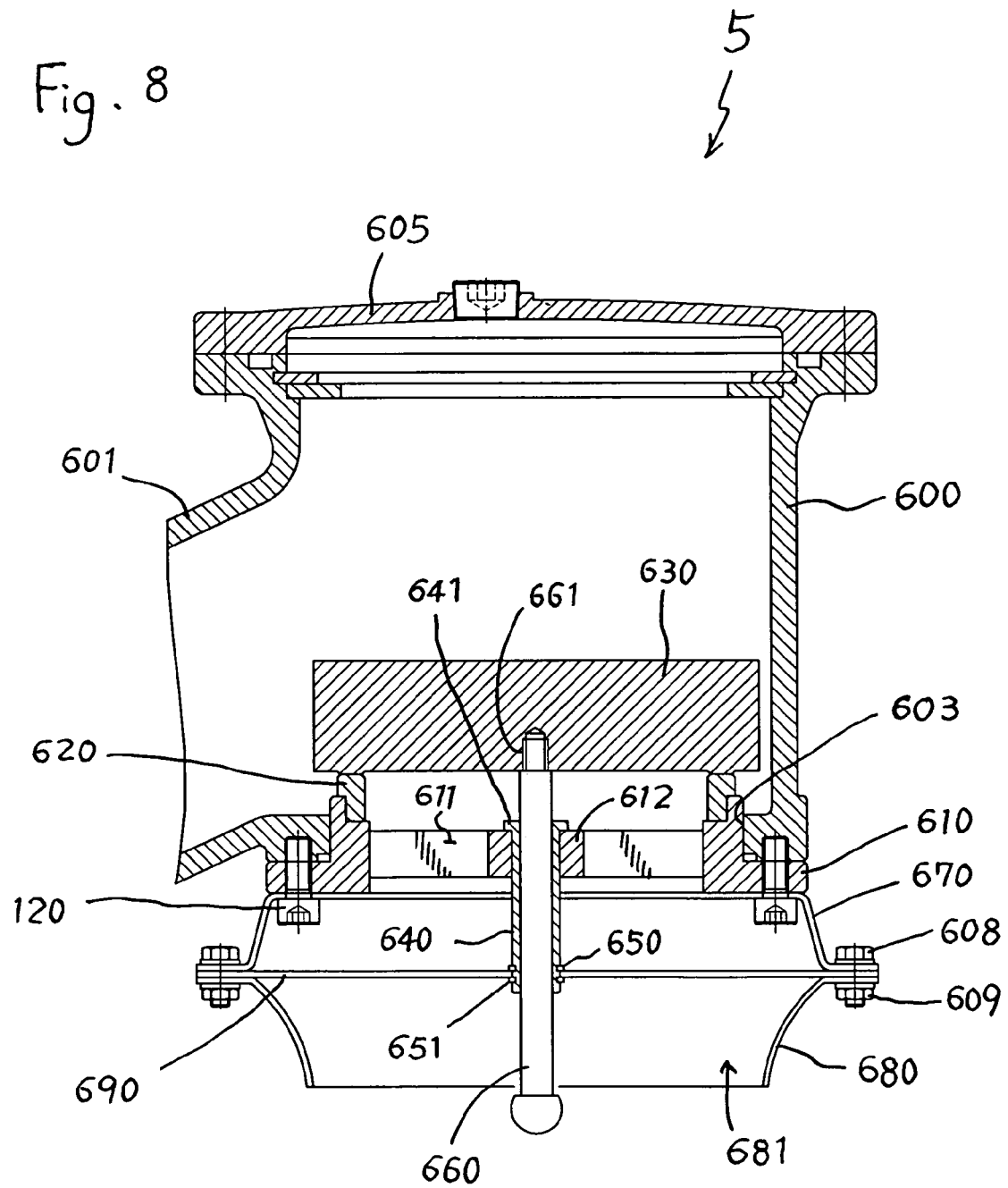
FIG. 8 is a cross sectional view of the vacuum relief valve of the invention.

In FIG. 8, a vacuum relief valve(5) of the invention has a much simpler construction as compared with outstanding conventional types of vacuum relief valves. A screen cover(670) and a screen hood(680) are not cast-iron but made out of thin iron plate which is manufactured by press process. Therefore, the size of the body(600) which is cast-iron has been reduced a great deal. Consequently the weight of the body(600) shows distinctive reduction by around 10% to 30% compared with that of a body of a conventional type of relief valve.

Further, the fixing method of the screen(690) is brand-new, simple and resolves the problems with the weight imposed on screen(690) and the upwards and downwards movement of the screen(690). The screen cover(670) and screen hood(680) are made of thin iron plate and accordingly very light weight, inexpensive in manufacturing cost. Therefore, it is convenient for assembling with the body(600) and easy for maintenance and repairing. Of course, a reduction in the size of the body(600) facilitates manufacturing, maintenance and repairing and reducing the cost.

In other words, the vacuum relief valve of the invention, as compared with a conventional type of vacuum relief valve, is lighter and smaller, has reduced number of parts and offers simple construction. Therefore, it provides conveniences in manufacturing and makes it easier to assemble, transport, maintain and repair. It also provides a competitive price, especially with a long term of operation screen(690), The screen(690) does not droop or move downwards and therefore durability of screen(690) greatly increases.

The invention uses the method of making the screen cover(670) and screen hood(680) through a press process. The screen cover and screen hood are manufactured separately from the body(600) and connected to the body(600) by bolts and nuts.

At the bottom area of the body(600) there is a hole(603) which allows the air outside of the tank to enter inside of the tank. Stem support(610) is assembled with this hole(603) as shown in FIG. 8. The stem support(610) with a ring seat(620) that contacts the close disc(630). It is also possible to eliminate the ring seat(620) and use the stem support(610) instead. In other words, the ring seat(620) can be united into one piece with the stem support(610). In addition, a boss(612) is formed in the center of a rib(611) in the stem support(610). A bushing(640) penetrates inside of the boss(612). The bushing(640) has a hooking tier(641) and the hooking tier(641) is hooked with an upper face of the boss(612) when assembled with the boss(612). Such an arrangement eliminates the problem with drooping downwards.

Next, a lower face of the bushing(640) penetrates the center of the screen(690). Therefore, it is required to form in the center of the screen(690) a hole which has a larger diameter than the outside diameter of the bushing(640). Further, a round fan-shaped screen cover(670) is placed at a lower face of the stem support(610). The screen cover(670) and stem support(610) are fixed at a lower face of the body(600) by a bolt(607).

One snap ring(650) is assembled with the upper face of the bushing(640). The screen(690) is connected to the bushing(640). A snap ring(651) is assembled with a lower face of the bushing(640). Therefore, the position of the screen(690) is firmly fixed on the bushing(640) as shown in FIG. 8. As for this reason, the upper and lower snap rings(650)(651) fix screen(690). As a next step, screen hood(680) is placed at a lower face of the screen(690) and then the screen cover(670), the screen(690) and the screen hood(680) are fixed together by a bolt(608) and a nut(609).

The stem(660) is inserted in the center of the bushing(640) and is connected to the close disc(630) by a screw(661). Of course it is common technique to assemble cover(605) on an upper face of body(600).

The invention with above-mentioned construction assembles the screen(690) using the bushing(640) and two snap rings(650, 651) to avoid imposing any over weight on the screen(690). By stably fixing the screen(690) in this manner, the screen(690) never droops downwards even after many hours of use. The screen(690) does not move up and down which also increases its durability. The bushing(640) with its long length plays a guiding role to lead the stem(660) to properly move up and down without trembling sideways and therefore keeps the screen(690) from being exposed to excessive force and enables precise operation of the close disc(630).

The invention reviewed as above does not place the lifting disc and weight inside of upper body or lower body but rather has these parts exposed in the air to make atmospheric pressure act properly. The simple construction of the relief valve releases out releasing gas swiftly and smoothly. By increasing the close pressure in close cycle, the invention prevents the valve from being opened for a longer time than necessary and prevents excessive release of gas. Therefore it offers safety benefits and economical advantages.

The invention, when using the assist weight, maintains the assist weight safely covered inside the weight cover. Therefore the invention, in contrast to a conventional type of relief valve, does not allow any flow variation by releasing gas regardless of number of weights used.

By adopting the construction of the housing, the invention allows releasing gas to move upwards vertically into the air and accordingly protects workers and reduces the chance of fire. Additionally, the invention basically does not allow the lifting disc and weight to take a position inside of the upper body or the lower body. Therefore, when the valve is in a state of closure, erosion of the lifting disc and stem is minimized. Accordingly, the invention can use normal type of metal instead of high-priced raw material and accordingly is cost-effective.

Along with this, the invention makes it possible to simply disassemble and replace main parts without separating the upper body from the lower body and therefore guarantees excellent properties in maintenance and repair and more convenient cleaning work for parts.

In addition, the drain part(3) of the invention makes it available to continuously drain sea water or rain gathering inside of the housing before concentrating and interrupting ascending and descending of the lifting disc.

The vacuum relief valve of the invention is simple in construction, easy to manufacture and maintain and light-weight therefore, much more suitable for relief valve of storing tank including vessel for oil or chemical product. The light weight and simplified construction of the relief valve is also convenient for cleaning and therefore economical. The relief valve provides for a stable screen by using a bushing and a snap ring and therefore avoids the problems with drooping movement of the screen. The relief valve also provides for a stem which properly moves up and down without trembling and accordingly improves durability of the screen.

What is claimed is:

1. A relief valve assembly which can be equipped for either vessels carrying oils or chemical products or for chemical tanks to safely release pressure gas (supersaturated gas) inside of the tank out into the air, the relief valve assembly comprising:

a lower body (10) which is fixed through the tank;
an upper body (20) in which a rib (22) is integral with a boss (23) having a screw hole for assembling a screw part (61) of a stem (60) and with which a disc seat (21) is assembled;
a stopper (62) which is fixed to a top part of the stem (60) by a cap nut (63);
a lifting disc (30) which has a ring (33) at a lower side of the lifting disc, a protruding stage (34) contacting the disc seat (21) of the upper body (20) and a closing valve, a first hole (32) penetrated by the stem (60) and a second hole (31) in which the stopper (62) assembled with the stem (60) can move by the cap nut (63), and the stem (60) guides the lifting disc (30) to move up and down, and;
a weight (40) which is assembled with the lifting disc (30) by a bolt (80);
a weight cover (70) which protects the weight (40) and provides space inside to enable assembling an assist weight (90) and;

a housing (50) which is assembled with the upper body (20) and leads releasing gas upwards out in a vertical direction and;
a water (sea water or rain) drain part (3) which is assembled by passing through a flange (20-1) of the upper body and a flange (10-1) of the lower body and drains water (sea water or rain) gathering inside of the housing (50) to outside and;
a vacuum relief valve (5) which is assembled with the lower body (10) and functions to build up atmospheric pressure inside of the tank.

2. A relief valve assembly which can be equipped for either vessels carrying oils or chemical products or for chemical tanks to safely release pressure gas (supersaturated gas) inside of tank out into the air, the relief valve assembly comprising:

a lower body (10a) which is fixed through to the tank;
an upper body (20a) in which a rib (22a) is integral with a boss (23a) having a screw hole for assembling a screw part (61a) of a stem (60a) and with which a disc seat (21a) is assembled;
a stopper (62a) which is fixed to a top part of the stem (60a) by a cap nut (63);
a lifting disc (30a) which has a protruding stage (34a) contacting the disc seat (21a) of the upper body (20a) and a closing valve, a first hole (32a) penetrated by the stem (60a) and a second hole (31a) in which a stopper (62a) assembled with the stem (60a) can move by cap nut (63) whereby the stem guides vertical movement of the lifting disc;
a first weight (40a) which is assembled with the lifting disc (30a) by a bolt (80a) and has in a center bushing (150) assembled with the second hole (31a) of the lifting disc (30a);
a second weight (40b) which has a ring (33a) at a lower side and is assembled with the first weight (40a) by a bolt (80b);
a weight cover (70a) which is assembled with the second weight (40b) by a weight cover bolt (110a);
a housing (50) which is assembled with the upper body (20a) and leads releasing gas upward out to in a vertical direction;
a water (sea water or rain) drain part (3) which is assembled by passing through a flange (20-1) of the upper body and a flange (10-01) of the lower body and drains water (sea water or rain) gathering inside of the housing 50 to the outside; and
a vacuum relief valve (5) which is assembled with the lower body (10) and functions to build up atmospheric pressure inside of the tank.

3. The relief valve assembly as claimed in claim 1, wherein the housing is assembled with the upper body (20) and a flange (53) by bolts and nuts and having a small diameter part (D1) which forms a narrow slot (G) with a side of the lifting disc (30), a large diameter part (D2) which forms a wide slot (G1) with the side of the lifting disc (30) when the lifting disc (30) moves up and an incline part (52) which is formed in a connection area between the large diameter part (D2) and the small diameter part (D1).

4. The relief valve assembly as claimed in claim 2, wherein the housing is assembled with the upper body (20a) and a flange (53a) by bolts and nuts and having a small diameter part (D1) which forms a narrow slot (G) with a side of the second weight (40b), a large diameter part (D2) which forms a wide slot (G1) with the side of the second weight (40b) when the second weight (40b) moves up and an incline part (52) which is formed in a connection area between the large diameter part (D2) and the small diameter part (D1).

5. The relief valve assembly as claimed in claim 1, wherein the outside diameter of the lifting disc (30) is larger than the diameter of the disc seat (21).

6. The relief valve assembly as claimed in claim 2, wherein the outside diameters of the lifting disc (30*a*) and the first weight (40*a*) are larger than the outside diameter of the disc seat (21*a*) and smaller than the outside diameter of the second weight (40*b*).

7. The relief valve assembly as claimed in claim 1, wherein the water (sea water or rain) drain part (3) has a vertical elbow (200) forming a screw (201) assembled through a screw hole (20-2) in the flange (20-1) of the upper body (20) and a screw hole (203) at the opposite side of the screw (201) and;

a horizontal elbow (300) forming a screw (303) assembled with the screw hole (203) of the vertical elbow (200) and a gas releasing slot (302) extending upward and a water slot (301) extending downward.

8. The relief valve assembly as claimed in claim 1, wherein the water (sea water or rain) drain part (3) has, an inner part penetrated by a hole (401), a J-shaped body (400) a head part (404) fixed through the holes (20-3) (10-3) of the upper body and the lower body, a tail part (405) facing upward at the opposite side of the head part (404), a gas releasing slot (402) formed inside of the tail part (405) and a water slot (403) formed at the bottom of the body (400).

9. The relief valve assembly as claimed in claim 1, wherein the vacuum relief valve (5) has, a stem support (610) which is assembled through a hole (603) of the lower part of a body (600), the upper part of the body is assembled with a ring seat (620) contacting a closure disc (630) and which has a rib (611) and a boss (612);

a bushing (640) which is assembled with the boss (612) of the stem support (610) and supports the stem (660) assembled with the closure disc (630);

a screen (690) which is assembled with a screen cover (670) and a screen hood (680) which is placed under a screen (690) and has an air hole (681) in its center and;

a snap ring (650, 651) which is assembled with a bushing (640) penetrating the center of screen (690) and prevents the screen (690) from moving up and down.

* * * * *